(12) United States Patent
Michailov et al.

(10) Patent No.: US 9,201,688 B2
(45) Date of Patent: Dec. 1, 2015

(54) CONFIGURATION OF ASYNCHRONOUS MESSAGE PROCESSING IN DATAFLOW NETWORKS

(75) Inventors: Zlatko V. Michailov, Redmond, WA (US); Stephen H. Toub, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 730 days.

(21) Appl. No.: 12/972,023

(22) Filed: Dec. 17, 2010

(65) Prior Publication Data

US 2012/0158651 A1     Jun. 21, 2012

(51) Int. Cl.
   *G06F 9/48*     (2006.01)
(52) U.S. Cl.
   CPC ........ *G06F 9/4881* (2013.01); *G06F 2209/485* (2013.01)
(58) Field of Classification Search
   CPC .................................................... G06F 9/4881
   USPC .......................................................... 707/613
   See application file for complete search history.

(56) References Cited

U.S. PATENT DOCUMENTS

| | | | | |
|---|---|---|---|---|
| 5,303,369 | A * | 4/1994 | Borcherding et al. | 718/104 |
| 5,619,695 | A * | 4/1997 | Arbabi et al. | 718/100 |
| 8,301,851 | B1 * | 10/2012 | Yu et al. | 711/158 |
| 2005/0096770 | A1 * | 5/2005 | Chua et al. | 700/102 |
| 2008/0082984 | A1 | 4/2008 | McDaniel | |

OTHER PUBLICATIONS

MSDN, "Asynchronous Agents Library," 2010, http://msdn.microsoft.com/en-us/library/dd492627.aspx.
Chu et al., "Actor-Based Programming with the Asynchronous Agents Library," MSDN Magazine, Sep. 2010, http://msdn.microsoft.com/en-us/magazine/ff959205.aspx.
Leijen et al., "Optimize Managed Code For Multi-Core Machines," Oct. 2007, http://msdn.microsoft.com/en-us/magazine/cc163340.aspx.
MSDN, "CCR Task Scheduling," Oct. 2010, http://msdn.microsoft.com/en-us/library/bb648756.aspx.
MSDN, "Other Concurrency Approaches," Oct. 2010, http://msdn.microsoft.com/en-us/library/bb648754.aspx.
MSDN, "Walkthrough: Creating a Dataflow Agent," Oct. 2010, http://msdn.microsoft.com/en-us/library/ff398051.aspx.
Zhang et al., "Method for partitioning large system models when using latency insertion method to speed network solution," Oct. 2010, http://vtb.engr.sc.edu/vtbwebsite/downloads/publications/Method%20for%20partitioning%20large%20system%20models%20when%20using%20latency%20insertion%20method%20to%20speed%20network%20solution.pdf.

* cited by examiner

*Primary Examiner* — James Trujillo
*Assistant Examiner* — Kurt Mueller
(74) *Attorney, Agent, or Firm* — Kevin Sullivan; Stein Dolan; Micky Minhas

(57) ABSTRACT

Managing a concurrency based system. A method includes determining a defined number of concurrent operations for a concurrency based management system. An operation queue is accessed. The operation queue stores or has therein zero or more asynchronous operations. An asynchronous operation is an operation that returns an object representing the asynchronous completion of the operation. The method further includes, as long as the queue is not empty, scheduling asynchronous operations from the queue until a number of asynchronous operations equal to the defined number has been reached.

20 Claims, 3 Drawing Sheets

CONFIGURATION OF ASYNCHRONOUS MESSAGE PROCESSING IN DATAFLOW NETWORKS

BACKGROUND

Background and Relevant Art

Computers and computing systems have affected nearly every aspect of modern living. Computers are generally involved in work, recreation, healthcare, transportation, entertainment, household management, etc.

A dataflow network is a network of concurrently executing processes or automata referred to as nodes that can communicate with each other by virtue of tree or graph edges connecting the nodes. Dataflow nodes in a dataflow network exist to process messages provided to them as input and/or output messages to other target nodes or receiving code.

Data operations may be of a synchronous type or asynchronous type. A synchronous operation is an operation that can block the caller on a user function. A processor or thread begins processing the operation, but requires input or processing by others before the operation can be completed. The processor or thread waits idle for the input or processing and completes processing the operation once the input or processing by others is received or completed. In summary, for synchronous operations, the operation's completion signals the end of the message's processing.

An asynchronous operation does not block the caller on a user function. A processor or thread begins processing an operation, but requires input or processing by others before finishing processing the operation. Rather than waiting idle for the input or processing, the processor or thread can perform other function until the input or processing by others is completed or received, and then returns to finish processing the operation once the input or processing by others is received or completed. In other words, for asynchronous operations, a first operation may asynchronously signal to the system upon the operation's completion for the first operation to be considered completed.

While dataflow systems provide support for dataflow blocks, these dataflow blocks may support processing only one message at a time, and they are limited to synchronous processing, meaning that the processing of a message is considered to start when a function to process that message is invoked and to complete when that function exits. It would be useful for dataflow network systems to be able to manage synchronous and asynchronous operations and to support multiple messages processing.

In dataflow systems, there is some overhead when assigning operations to processing blocks. In some cases, the overhead of assigning an operation may actually be more expensive in terms of computing resources to schedule than it is to simply perform the operation. Thus, it would be useful to reduce the amount of scheduling needing in dataflow processing systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method practiced in a computing environment. The method includes acts for managing a concurrency based system. The method includes determining a defined number of concurrent operations for a concurrency based management system. An operation queue is accessed. The operation queue stores or has therein zero or more asynchronous operation messages indicating operations to be performed. An asynchronous operation is an operation that returns an object representing the asynchronous completion of the operation. The method further includes, so long as the queue is not empty, scheduling asynchronous operations from the queue until a number of asynchronous operations equal to the defined number has been reached.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some example embodiments described herein implement a concurrency based management system whereby synchronous and asynchronous operations can be scheduled and performed by a dataflow system. In particular, synchronous and asynchronous operations can be performed in parallel based on concurrency capabilities of a dataflow block.

As noted, some dataflow systems provide support for dataflow blocks. These dataflow blocks support processing only one message at a time, and they are limited to synchronous processing, meaning that the processing of a message is considered to start when a function to process that message is invoked and to complete when that function exits. However, some embodiments herein support multiple messages of both synchronous and asynchronous types, based on concurrency capabilities.

In particular, dataflow processing blocks maintain a count for the number of outstanding operations, which are represented herein as tasks. These tasks may be represented as "futures" (as illustrated in more detail below) in the case of asynchronous operations. Synchronous operations can be converted to asynchronous operations by processing a quantity of the synchronous operations. A quantity of synchronous operations can be represented by a future as well.

When new messages arrive, additional processing futures are spun up if the number of outstanding operations is below the maximum threshold of the concurrency capabilities. These processing futures launch asynchronous operations, each of which is tracked individually, and the count is managed based on when the launched futures complete. Upon completion of a future, if more messages are available to be processed, further futures may be launched to process those messages, again subject to the maximum concurrency threshold. Alternatively, embodiments may be implemented that are able to reuse already launched futures to process messages. This can result in an overhead savings, as a new future will not need to be spun up to process the message.

Figure 1:
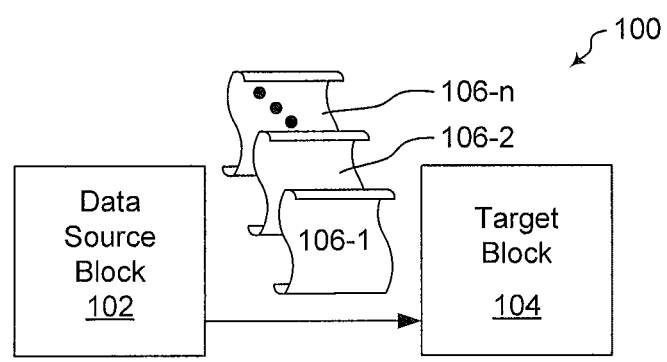
FIG. 1 illustrates a dataflow system.

Referring now to FIG. 1, an example is illustrated. FIG. 1 illustrates a simple dataflow system 100. The dataflow system 100 includes a data source block 102 and a target block 104. The data source block 102 sends messages (referred to generally as 106, but shown in FIG. 1 specifically as 106-1, 106-2, and 106-n) to the target block 104 for processing. The target block can accept and process multiple messages 106. While in this simple example, messages 106 are sent from the data source block 102 to a target block 104, it should be appreciated that the dataflow network may include many blocks, each of which performs some function on data provided to it from a source block. For example, the target block 104 may be a source block for another block downstream from the target block 104.

Figure 2A:
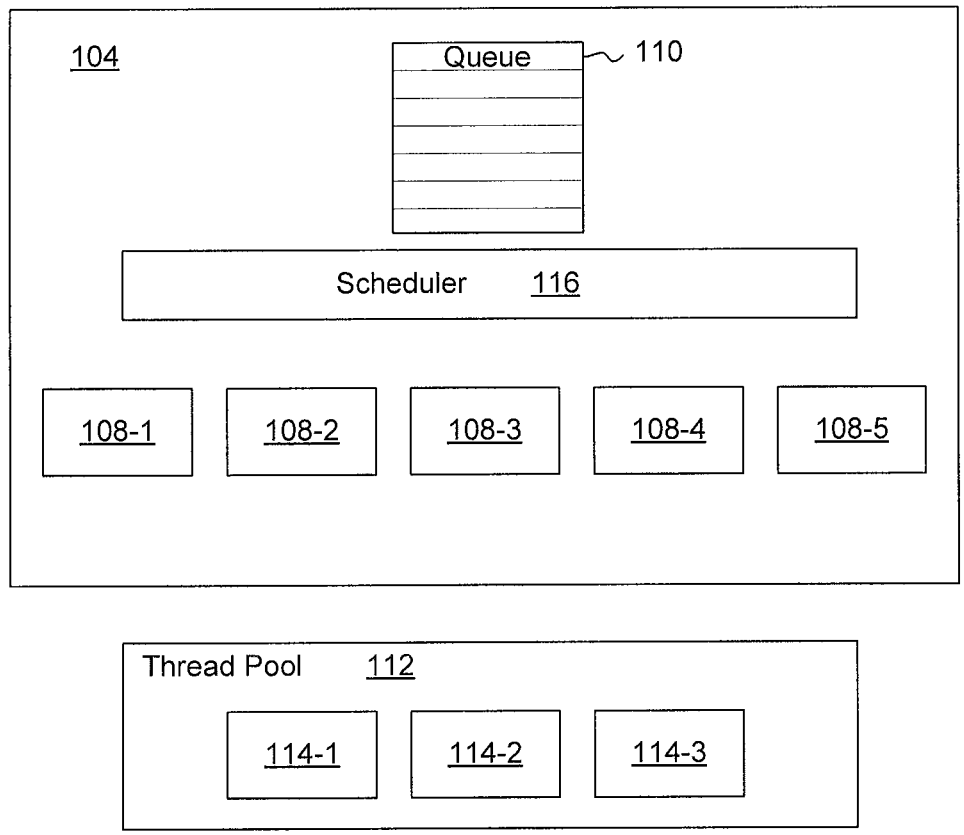
FIG. 2A illustrates additional details of a target block.

Referring now to FIG. 2A, additional details of the target block 104 are illustrated. The target block 104 has concurrency capabilities in that in can process multiple messages at any given time. In the example illustrated, the target block 104 has a concurrency capability of five. Additionally, the target block is executing at its maximum concurrency of five as illustrated by the five futures, referred to herein generally as 108, but shown specifically as 108-1, 108-2, 108-3, 108-4, and 108-5. While the target block is shown executing at its maximum capacity of five futures 108, it should be appreciated that the target block 104 may be running any number of futures from zero to five futures. Additionally, other systems may have different concurrency capabilities and the example of a maximum concurrency threshold of five is only illustrative. Further, while only a single block 104 is illustrated, it should be appreciated that different systems can have more blocks which also have separate concurrency capabilities. Each of the different futures 108 in the different blocks of a dataflow system draws upon a thread set to access hardware computing resources for performing the futures 108.

FIG. 2A further illustrates a thread set 112. The thread set represents the threads, referred to generally as 114, but illustrated specifically as 114-1, 114-2, and 114-3, which can be used to perform the futures 108. Notably, the thread set 112 does not need to include a number of threads 114 equal to the concurrency threshold of one or all blocks in the dataflow system 100. For example, concurrency thresholds can be higher by virtue of thread sharing or freeing up of threads due to asynchronous futures being performed. For example, an example asynchronous download future may be a download future. The asynchronous download future 108 may include requesting that some data be downloaded from an external source. A thread 114 is used by the asynchronous future 108 to make the download request and is then freed to be used by another future while the data downloads. Once the data has downloaded, the asynchronous future may request use of a thread 114 to perform further processing.

The threads 114 illustrated herein may take any one of a number of different forms. For example, each thread may be the single thread included as part of a single processor core in a multi-core system. In particular, a processor core may have a single arithmetic logic unit (ALU) and a single set of thread registers which are comprised of the single thread. Alternatively, each thread may be one thread from among a plurality of threads of a single processor. For example, a core may have a single ALU, but multiple sets of thread registers, such that multiple threads are implemented using a single core. Alternatively, virtual threads may be implemented where an operating system or other software manages virtual threads and schedules the virtual thread to execute on underlying hardware processors or hardware threads.

Illustrating now more detailed examples of functionality, in some embodiments, a dataflow processing block, e.g. target block 104, maintains a count of the number of messages that may be processed concurrently. In the example shown in FIGS. 1 and 2, that number is five. When new messages 106 arrive into the target block's input queue 110, the target block 104 checks whether the current concurrency level is less than the maximum level allowed, i.e. five. If it is, new futures 108 may be spun up to execute a user-provided function for the input message 106, up to the maximum concurrency level allowed. That user-provided function may be deemed synchronous or asynchronous. For synchronous, the function's completion signals the end of the message's processing. The future exists and a number tracking the current number of futures 108 for the block 104, i.e. the concurrency level, is decremented. For asynchronous functions, the function returns a future to represent the asynchronous completion of the message's processing. That future's 108 completion signals the end of the message's processing. When a message's processing is completed, the count of the current concurrency level may be decremented, allowing other futures 108 to be spun up. As will be illustrated below, other embodiments may reuse futures to reduce the amount of overhead needed for message processing. In particular, a single future may be used to processes a quantity of similar or identical messages.

As discussed above, processing of asynchronous operations are represented using a future type. The future type may support multiple completion states: RanToCompletion, Faulted, and Canceled. The first two states are direct corollaries to a synchronous invocation of a function either running to completion or causing an error such as throwing an exception out of the function. The third state may potentially be triggered by input, such as a specific kind of exception that indicates the operation was canceled, or it may be achieved through directly information the "future" that the operation was canceled. Embodiments may be implemented where when the processing of an asynchronous operation completes, the completion status, final result, and exception information is all available from the future representing the operation. Continuation operations may be registered with the future object to be notified of its completion, and to perform operations such as decrementing the concurrency count mentioned previously.

When new messages arrive at a target block 104 and the maximum concurrency level has been reached, further data may be buffered in input queues, such as queue 110, until such time that resources are available to process those messages.

When futures 108 complete the processing of a message 106, they may attempt to minimize overheads by picking off the next message from the input queues 110 and processing it, rather than returning completely and forcing a new future to be spun up to process the next message in the queue 110. However, to aid in fairness of processing across multiple dataflow blocks, this behavior may be configurable in a manner that enables control of the maximum number of messages (illustrated as a quantity below) an individual future 108 may process. In one embodiment, the future itself may be defined as to the number of messages 106 that it can process before the future ends. This allows other futures 108 to have an opportunity to be spun up and executed. If a future 108 processing messages 106 finds that it has already processed the maximum number (i.e. the quantity), it will retire itself, in the process potentially spinning up a replica of itself to continue the processing. This allows the underlying thread 114 that was running the future 108 to be released and to process other futures waiting for processing time.

Illustrating now a specific example, a first set of messages may be sent to the target block 104. The first set of messages may include 100 messages to be processed by a given function. The target block may be configured to create functions that only allow a future 108 to process 10 messages before the future 108 is retired. A different set of messages may also be sent to the target block 104. The target block may spin up a future 108 to process messages from the first set of messages. The future 108 will process a message from the set of 100 messages and once the message is processed will return to the queue 110 to obtain the next message from the set of 100 messages. This will continue until the first ten messages of the set of 100 messages have been processed. The future 108 will then retire itself releasing a thread 114 being used to perform the future 108. This allows the thread to be used by a different future that is then spun up to process one or more of the messages in the different set of messages. The future 108, when a thread is available, will spin up a replica of itself to process an additional 10 messages from the set of 100 messages.

These futures may also be scheduled to run on custom scheduling environments. A developer provides as a configuration option to the dataflow block a scheduler entity 116 which controls how the generated futures are executed. The dataflow target block 110 creates its futures and hands them off to the scheduler, which then decides where and when to execute the futures. Further, the functions in these futures execute in an environment where the provided scheduler 116 is exposed as TaskScheduler.Current, meaning that any futures generated during the processing of that message will also be scheduled to that scheduler. This enables asynchronous functions to easily break up their processing into multiple individual futures, each of which will automatically by default be scheduled to the target scheduler 116.

Figure 2B:
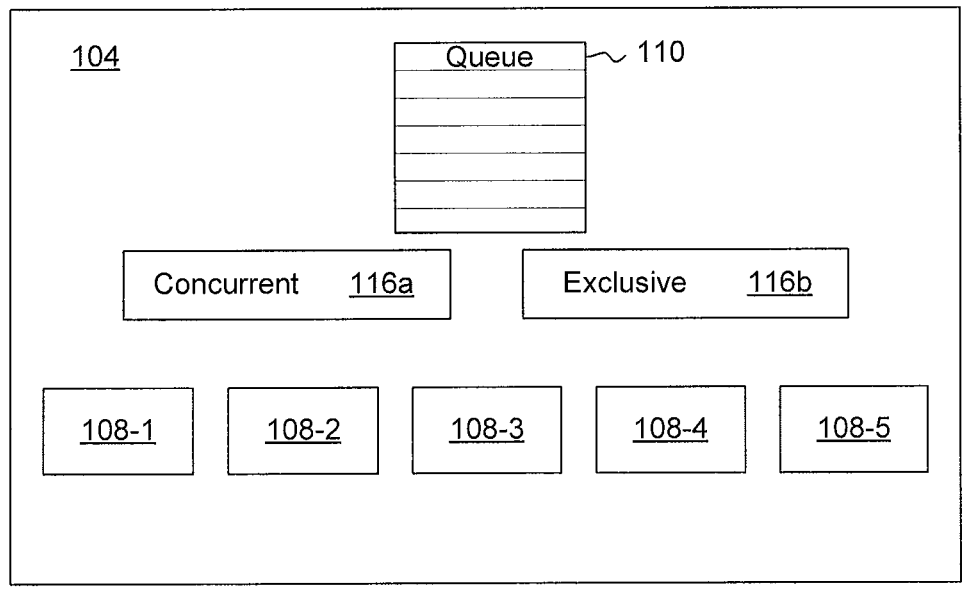
FIG. 2B illustrates additional details of a target block including using colluding schedulers.

Referring now to FIG. 2B, an alternative embodiment for scheduler components is illustrated. FIG. 2B illustrates that the target block 104 includes a pair of schedulers 116a and 116b. In the example illustrated there is a pair of schedulers that collude so that each scheduler colluding knows what the other scheduler is doing, including a concurrent scheduler 116a and an exclusive scheduler 116b. In the case of the exclusive scheduler 116a, any future scheduled to the exclusive scheduler 116a will be guaranteed to be an exclusive future being the only future that is running at a given time on either scheduler 116a or 116b in the target block 104. The concurrent scheduler will be able to run any number of futures concurrently as long as there are not any exclusive futures running. For example, this scheduler arrangement may be used to implement a reader/writer scenario where any number of readers can be executing as long as they are only readers and not writers. But only one writer future is executing at a time as long as there is no other read or write futures executing. Embodiments could have action blocks configured to be on the exclusive scheduler 116a. In this way all the work that the blocks schedule will in effect be serialized to eliminate threading issues.

Some embodiments may be implemented using functionality in .NET 4 framework available from Microsoft Corporation of Redmond Wash. For example, dataflow processing blocks maintain a count for the number of outstanding operations, all of which are represented as "futures." In .NET 4, this may be accomplished using System.Threading.Task.Task and System.Threading.Task.Task<TResult>. When new messages arrive, additional processing futures are spun up if the number of outstanding operations is below the maximum threshold. These processing futures launch asynchronous operations, each of which is tracked individually, and the count is managed based on when the launched futures complete; upon their completion, if more messages are available to be processed, further futures may be launched to process those messages, again subject to the maximum threshold.

A dataflow processing block maintains a count of the number of messages that may be processed concurrently. When new messages arrive into the block's input queue, the block checks whether the current concurrency level is less than the maximum level allowed. If it is, new futures may be spun up to execute a user-provide function for the input message, up to the maximum concurrency level allowed. That user-provided function may be deemed synchronous or asynchronous. For synchronous, the function's completion signals the end of the message's processing; for asynchronous, the function returns a future, i.e. a Task or a Task<TResult> in .NET 4, to represent the asynchronous completion of the message's processing. That future's completion signals the end of the message's processing. When a message's processing is completed, the count may be decremented.

Processing of asynchronous operations is represented using a future type that supports multiple completion states: RanToCompletion, Faulted, and Canceled. The first two states are direct corollaries to a synchronous invocation of a function either running to completion or throwing an exception out of the function; the third state is may potentially be triggered by a specific kind of exception that indicates the operation was canceled, or it may be achieved through directly information the "future" that the operation was canceled (e.g. SetCanceled( )). In the .NET solution, this is handled by the .NET Task and Task<TResult> type. When the processing of an asynchronous operation completes, the completion status, final result (in the case of a Task<TResult>), and exception information is all available from the future representing the operation.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
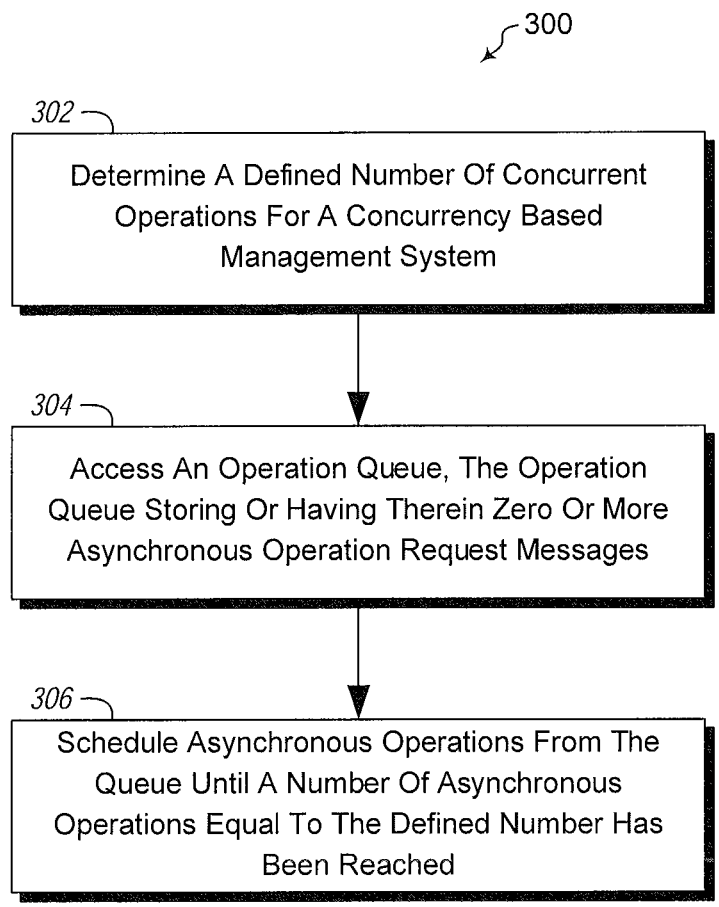
FIG. 3 illustrates a method of managing a concurrency based system.

Referring now to FIG. 3, a method 300 is illustrated. The method 300 may be practiced in a computing environment and includes acts for managing a concurrency based system. The method 300 includes determining a defined number of concurrent operations for a concurrency based management system (act 302). For example, in FIG. 2A, the system has a concurrency limit of five.

The method 300 further includes accessing an operation queue (act 304). The operation queue stores or has therein zero or more asynchronous operation request messages. An asynchronous operation is an operation that returns an object representing the asynchronous completion of the operation. For example, the queue 110 may have a number messages stored therein.

The method 300 further includes, so long as the queue is not empty, scheduling asynchronous operations from the queue until a number of asynchronous operations equal to the defined number has been reached (act 306). For example, embodiments may schedule five asynchronous operations using the scheduler 116 from the queue 110 for executions as operations unless the queue is empty before five asynchronous operations can be scheduled.

The method 300 may be practiced where scheduling operations from the queue includes converting synchronous operations to asynchronous operations. A synchronous operation is an operation in which the operation's completion signals the end of a message's processing.

In some embodiments, converting synchronous operations to asynchronous operations includes reusing the scheduling act to process a quantity of synchronous operations as a set. For example, a quantity of synchronous operations that have the same future performed for them can be scheduled to be executed as a group converting the group of synchronous operations to a single asynchronous operation. In some embodiments, the quantity is limited to a defined number of synchronous operations. For example, as illustrated above, a first set of messages may include 100 messages to be processed by a given function. The target block may be configured to create functions that only allow a future 108 to process 10 messages before the future 108 is retired. If additional messages from the first set of messages remain, an additional process to process 10 messages can be spun up. However, by limiting the number of messages that can be processed in a quantity, threads will not be blocked by a single quantity for an undue extended period of time. In some embodiments, the defined number of synchronous operations is dynamic number. In alternative embodiments, the defined number of synchronous operations is a static pre-determined number.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform futures. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of managing a concurrency based system, the method comprising:
   determining a maximum number of concurrent operations for a concurrency based management system;
   accessing an operation queue, the operation queue storing or having therein zero or more asynchronous operation request messages;
   maintaining a count for a number of scheduled operations;
   while the queue is not empty and while the count for the number of scheduled operations is less than the maximum number, scheduling asynchronous operations from the queue and incrementing the count for the number of scheduled operations, wherein scheduling asynchronous operations comprises, for each scheduled operation, instantiating a future object representing the each scheduled operation, the future object supporting completion states including ran to completion, faulted, and cancelled; and
   upon completion of a scheduled operation,
      notifying continuation operations which have been registered to be notified of the completion of the scheduled operation with the state of the future object representing the scheduled operation,
      disposing the future object representing the scheduled operation, and
      decrementing the count for the number of scheduled operations.

2. The method of claim 1, wherein scheduling operations from the queue comprises converting synchronous operations to asynchronous operations, wherein a synchronous operation is an operation in which the operation's completion signals the end of a message's processing.

3. The method of claim 2, wherein converting synchronous operations to asynchronous operations comprises reusing the scheduling act to process a quantity of synchronous operations as a set.

4. The method of 3, wherein the quantity is limited to a defined number of synchronous operations.

5. The method of claim 4, wherein the defined number of synchronous operations is dynamic number.

6. The method of claim 4, wherein the defined number of synchronous operations is a pre-determined number.

7. The method of claim 1, wherein scheduling is performed by a pair of colluding schedulers, wherein one of the colluding schedulers schedules concurrent operations and the other scheduler in the pair of colluding schedulers schedules exclusive operations and wherein the schedulers in the pair of schedulers are able to determine operations scheduled by each other.

8. The computing system of claim 7, wherein the colluding schedulers are used to implement a reader writer scenario.

9. In a computing environment, one or more physical computer readable storage media comprising computer executable instructions that when executed by one or more processors causes the following to be performed:
   determining a maximum number of concurrent operations for a concurrency based management system;
   accessing an operation queue, the operation queue storing or having therein zero or more asynchronous operation request messages;
   maintaining a count for a number of scheduled operations;
   while the queue is not empty and while the count for the number of scheduled operations is less than the maximum number, scheduling asynchronous operations from the queue and incrementing the count for the number of scheduled operations, wherein scheduling asynchronous operations comprises, for each scheduled operation, instantiating a future object representing the each scheduled operation and the future object supporting completion states including ran to completion, faulted, and cancelled; and
   upon completion of a scheduled operation,
      notifying continuation operations which have been registered to be notified of the completion of the scheduled operation with the state of the future object representing the scheduled operation,
      disposing the future object representing the scheduled operation, and
      decrementing the count for the number of scheduled operations.

10. The computer readable storage media of claim 9, wherein scheduling operations from the queue comprises converting synchronous operations to asynchronous operations, wherein a synchronous operation in which the operation's completion signals the end of a message's processing.

11. The computer readable storage media of claim 10, wherein converting synchronous operations to asynchronous operations comprises reusing the scheduling act to process a quantity of synchronous operations as a set.

12. The computer readable storage media of 11, wherein the quantity is limited to a defined number of synchronous operations.

13. The computer readable storage media of claim 12, wherein the defined number of synchronous operations is dynamic number.

14. The computer readable storage media of claim 12, wherein the defined number of synchronous operations is a pre-determined number.

15. The computer readable storage media of claim 9, scheduling is performed by a pair of colluding schedulers, wherein one of the colluding schedulers schedules concurrent operations and the other scheduler in the pair of colluding schedulers schedules exclusive operations and wherein the schedulers in the pair of schedulers are able to determine operations scheduled by each other.

16. In a computing environment, a computing system for managing a concurrency based system, the computing system comprising:
   one or more processors;
   physical computer readable media coupled to the one or more processors, the physical computer readable media comprising computer executable instructions that, when executed, cause one or more of the processors to perform the following:
      determining a maximum number of concurrent operations for a concurrency based management system;
      accessing an operation queue, the operation queue storing or having therein zero or more asynchronous operation request messages and zero or more synchronous operation request messages;
      maintaining a count for a number of scheduled operations;
      scheduling synchronous operations from the queue, wherein scheduling synchronous operations from the queue comprises converting synchronous operations to asynchronous operations by processing one or more synchronous operations from the queue as a set and instantiating a future object representing the set of one or more scheduled synchronous operations, the future object being a type supporting completion states including ran to completion, faulted, and cancelled; and
      upon completion of the set of scheduled operations, notifying continuation operations which have been registered to be notified of the completion of the scheduled operations with the state of the future object representing the scheduled operations, disposing the future object representing the scheduled operations, and decrementing the count for the number of scheduled operations.

17. The computing system of claim 16, wherein the quantity is limited to a defined number of synchronous operations.

18. The computing system of claim 17, wherein the defined number of synchronous operations is dynamic number.

19. The computing system of claim 17, wherein the defined number of synchronous operations is a pre-determined number.

20. The computing system of claim 16, wherein scheduling is performed by a pair of colluding schedulers, wherein one of the colluding schedulers schedules concurrent operations and the other scheduler in the pair of colluding schedulers schedules exclusive operations and wherein the schedulers in the pair of schedulers are able to determine operations scheduled by each other.

\* \* \* \* \*